United States Patent
Lumia et al.

(10) Patent No.: US 7,192,490 B1
(45) Date of Patent: Mar. 20, 2007

(54) METHOD FOR TREATING AND EXTRACTING CORK ORGANIC COMPOUNDS, WITH A DENSE FLUID UNDER PRESSURE

(75) Inventors: Guy Lumia, Pont Saint Esput (FR); Christian Perre, Pierrelatte (FR); Jean-Marie Aracil, Taurinya (FR)

(73) Assignees: Commissariat a l'Energie Atomique, Paris (FR); Sabate SA., Ceret (FR)

( * ) Notice: Subject to any disclaimer, the term of this patent is extended or adjusted under 35 U.S.C. 154(b) by 0 days.

(21) Appl. No.: 10/089,162

(22) PCT Filed: Sep. 26, 2000

(86) PCT No.: PCT/FR00/02653

§ 371 (c)(1),
(2), (4) Date: Mar. 27, 2002

(87) PCT Pub. No.: WO01/23155

PCT Pub. Date: Apr. 5, 2001

(30) Foreign Application Priority Data

Sep. 27, 1999 (FR) .................................. 99 12003

(51) Int. Cl.
*B08B 3/00* (2006.01)
(52) U.S. Cl. .................... 134/34; 134/16; 134/19; 134/25.3; 134/26; 134/30; 134/35; 134/36; 134/42
(58) Field of Classification Search .................. 134/19, 134/16, 25.3, 26, 30, 34, 35, 36, 42
See application file for complete search history.

(56) References Cited

U.S. PATENT DOCUMENTS

| | | | | |
|---|---|---|---|---|
| 4,308,200 A | * | 12/1981 | Fremont | 530/202 |
| 4,714,591 A | * | 12/1987 | Avedesian | 422/140 |
| 4,964,995 A | * | 10/1990 | Chum et al. | 210/634 |
| 4,992,308 A | * | 2/1991 | Sunol | 427/297 |
| 5,094,892 A | * | 3/1992 | Kayihan | 427/440 |
| 5,364,475 A | | 11/1994 | Levien et al. | |
| 5,476,975 A | * | 12/1995 | Ruddick et al. | 568/762 |

FOREIGN PATENT DOCUMENTS

| | | |
|---|---|---|
| DE | 42 23 029 | 3/1994 |
| EP | 0 395 010 | 10/1990 |
| EP | 1122259 A2 * | 8/2001 |
| FR | 2 597 778 | 10/1987 |
| WO | 98 16288 | 4/1998 |
| WO | WO2005/025825 * | 3/2005 |

OTHER PUBLICATIONS

Taylor et al. "Supercritical Fluid Extraction of 2,4,6-Trichloroanisole from Cork Stoppers", J. Agric. Food Chem. Jun. 2002, 2208-2211.*

(Continued)

*Primary Examiner*—Sharidan Carrillo
(74) *Attorney, Agent, or Firm*—Oblon, Spivak, McClelland, Maier & Neustadt, P.C.

(57) ABSTRACT

Process for the treatment of cork or a cork-based material particularly with a view towards extracting contaminating organic compounds, in which said cork or said cork-based material is put into contact with a dense fluid under pressure at a temperature of from 10 to 120° C. and at a pressure of from 10 to 600 bars.

Manufacturing installation for parts made of cork or a cork-based material, such as bottle corks, comprising an installation for treatment or extraction by putting the said cork or the said material into contact with a dense fluid under pressure.

26 Claims, 3 Drawing Sheets

OTHER PUBLICATIONS

Maricato "Study of the Extraction of Trichloroanisole by Supercritical CO2", 1995, pp. 1-39, certified translation.*

Ana M. Miranda et al.: "High-pressure extraction of cork with CO2 and 1,4-dioxane" Chemical Abstracts, vol. 126, No. 8 Feb. 24, 1997; abstract No. 101255.

J.R. del Rio Garcia: "Use of sulfur dioxide and ethylene oxide in disinfection of corks" Chemical Abstracts, vol. 91, No. 21 Nov. 19, 1979; abstract No. 173344.

H. Pereira, Wood Sci. Technol., vol. 22, No. 3, pp. 211-218, "Chemical Composition and Variability of Cork From *Quercus suber* L.," 1988.

A. Guillemonat, Ann. Fac. Sc. De Marseille, vol. 30, pp. 43-54, "Progrès Récents Dans L'étude de la Constitution Chimique du Liège," 1960.

Maricato, Luis-Carlos, *Etude de l'extraction du Trichloroanisole par CO$_2$Supercritique, Rapport de stage de fin d'études*, Institut des Sciences de l'Ingénieur de Montpellier, France, 1996.

Montamedi, L., *Supercritical Fluid Processing: Application Fields*, Riza Werkdocument No. 96.072X, 1996.

Taylor, M.K., et al., *Supercritical fluid extraction (SFE) for quantitative analysis of TCA in cork*, Am. J. Enol. Vitic., 1999, vol. 50, No. 3.

Fages, II, Jacques, et al., *Use of Supercritical Fluid Extraction as a Method of Cleaning Anterior Cruciate Ligament Prostheses*, ASAIO Journal, Jul.-Aug. 1998, vol. 44, No. 4, pp. 278-288.

Fages, Jacques, et al., *Use of supercritical CO$_2$for bone delipidation*, Biomaterials, 1994, vol. 15, No. 9, pp. 650-656.

Fages, Jacques, et al., *Use of supercritical CO$_2$for bone delipidation*, Biomaterials, 1994, vol. 15, No. 9, pp. 650-656.

Dehghani, Fariba, *Inactivation of Various Microorganisms using Carbon Dioxide at High Pressure*, Aug. 31, 1999, vol. 96, Issue 18, 10344-10348.

*Fluides Supercritiques Et Matériaux*, edited by F. Cansell and J.P. Petitet, 1995.

Thesis by D. Chouchi, Institut National Polytechnique de Lorraine, Ecole Nationale Supérieure des Industries Chimiques-Nancy-France, 1995.

Matthews, Michael A., et al., *Exploring the Feasibility of Using Dense-Phase Carbon Dioxide for Sterilization*, Review 2001.

Danaher, Martin, et al., *Extracting Residues of Contaminants from Food with Supercritical Carbon Dioxide*, Business Briefing: Foodtech, pp. 1-7.

Chouchi, et al., "SFE of Trichloroanisole from Cork", Proceedings of the 4th International Symposium on Supercritical Fluids, May 11-14, Sendai, Japan, 1997, pp. 379-382.

Chouchi, D., et al., "SFE of Trichloroanisole from Cork", The 4th International Symposium on Supercritical Fluids, May 11-14, Sendai, Japan, 1997, pp. 380-382.

Miranda, Ana M., et al., "High-Pressure Extraction of Cork with CO$_2$ and 1,4-Dioxane", Process Technol. Proc. (1996), 12, High Pressure Chemical Engineering, pp. 417-422.

Debs-Louka, E., et al., "Effect of Compressed Carbon Dioxide on Microbial Cell Viability", Applied and Environmental Microbiology, Feb. 1999, pp. 626-631.

Dillow, Angela K., et al., "Bacterial inactivation by using near-and supercritical carbon dioxide", Proc. Natl. Acad. Sci., vol. 96, Aug. 1999, pp. 10344-10348.

Van Leer, Ruth A., et al., "Solubilities of Phenol and Chlorinated Phenols in Supercritical Carbon Dioxide", J. Chem. Eng. Data, 1980, 25, pp. 257-259.

E. Reverchon, et al. "Supercritical extraction of clove bud essential oil: isolation and mathematical modeling," Chemical Engineering Science, vol. 52, No. 20, 1997, pp. 3421-3428.

V. Illés, et at., "Extraction of hiprose fruit by supercritical CO$_2$ and propane," Journal of Supercritical Fluids, 10, 1997, pp. 209-218.

P.M. Tomasula, et al., "A Continuous Process for Casein Production Using High-pressure Carbon Dioxide," Journal of Food Engineering, 33, 1997, pp. 405-419.

H. Li, et al., "Isolation and NMR studies of di-D-fructose anhydride III from *Lycoris radiate* Herbert by supercritical extraction with carbon dioxide," Carbohydrate Research, 299, 1997, pp. 301-305.

E. Reverchon, "Supercritical fluid extraction and fractionation of essential oils and related products," Journal of Supercritical Fluids, 10, 1997, pp. 1-37.

V. Vandana, et al., "Supercritical Extraction and HPLC Analysis of Taxol from *Taxus brefivolia* Using Nitrious Oxide and Nitrous Oxide+Ethanol Mixtures," Fluid Phase Equilibria, 116, 1996, pp. 162-169.

L.A. Green, et al., "Supercritical CO$_2$ Extraction of Soil-Water Slurries," The Journal of Supercritical Fluids, 9, 1996, pp. 177-184.

G.D. Porta, "Rose Concrete Fractionation by Supercritical CO$_2$," The Journal of Supercritical Fluids, 9, 1996, pp. 199-204.

L. Owens, et al., "Characterization of vanadium / silica and copper / silica aerogel catalysts," Journal of Non-Crystalline Solids, 186, 1995, pp. 177-183.

E. Reverchon, et al., "Supercritical CO$_2$ Fractionation of Jasmine Concrete," The Journal of Supercritical Fluids, 8, 1995, pp. 60-65.

M. Jakobsson, et al., "Counter-Current Extraction of Dioxins from Cod Liver Oil by Supercritical Carbon Dioxide," The Journal of Supercritical Fluids, 7, 1994, pp. 197-200.

E. Mitura, et al., "The properties of diamond-like carbon layers deposited onto SiO$_2$ aerogel," Diamond and Related Materials, 3 (1994), pp. 868-870.

Z. Knez, "Solubility of Capsaicin in Dense CO$_2$," The Journal of Supercritical Fluids, 5, 1992, pp. 251-255.

M.B. King, et al., "The Mutual Solubilities of Water with Supercritical and Liquid Carbon Dioxide," The Journal of Supercritical Fluids, 6, 1996, pp. 296-302.

Z. Yu, et al., "Phase Equilibria of Oleic Acid, Methyl Oleate, and Anhydrous Milk Fat in Supercritical Carbon Dioxide," The Journal of Supercritical Fluids, 5, 1992, pp. 114-122.

Z. Yu, et al., "Fluid-Liquid Equilibria of Anhydrous Milk Fat with Supercritical Carbon Dioxide," The Journal of Supercritical Fluids, 6, 1992, pp. 123-129.

S. Li, et al., "Influence of Co-Solvents on Solubility and Selectivity in Extraction of Xanthines and Cocoa Butter from Cocoa Beans with Supercritical CO$_2$," The Journal of Supercritical Fluids, 5, 1992, pp. 7-12.

M. Yanagiuchi, et al., "Fundamental Investigation on Supercritical Extraction of Coal-Derived Aromatic Compounds," The Journal of Supercritical Fluids, 5, 1991, pp. 145-151.

M. Jakobsson, et al., "Extraction of Dioxins from Cod Liver Oil by Supercritical Carbon Dioxide," The Journal of Supercritical Fluids, 4, 1991, pp. 118-123.

M. Ko, et al., "Solubility of the Antibiotic Penicillin V in Supercritical CO$_2$," The Journal of Supercritical Fluids, 4, 1991, pp. 32-39.

R.K. Kess et al., "Supercritical Extraction of Phenol from Soil," The Journal of Supercritical Fluids, 4, 1991, pp. 47-52.

R.M. Lansangan, et al., "Binary Vapor-Liquid Equilibria Behavior in the Vicinity of Liquid-Liquid-Vapor Loci," Fluid Phase Equilibrium, 63, 1987, pp. 49-66.

S.A. El-Fatah, et al., "Supercritical fluid extraction of hazardous metals from CCA wood," J. of Supercritical Fluids, 28, 2004, pp. 21-27.

B. Aikawa, et al., "Catalytic hydrodechlorination of 1-chlorooctadecane, 9,10-dichlorostearic acid, and 12,14-dichlorodehydroabietic acid in supercritical carbon dioxide," Applied Catalysis B: Environmental, 43, 2003, pp. 371-387.

A. Demirbas, "Biomass resource facilities and biomass conversion processing for fuels and chemicals," Energy Conversion and Management, 42, 2001, pp. 1357-1378.

L.H. McDaniel, et al., "Supercritical fluid extraction of wood pulp with analysis by capillary gas chromatography-mass spectrometry," Journal of Supercritical Fluids, 19, 2001, pp. 275-286.

A. Hassan, et al., "Modeling phase behavior of multicomponent mixtures of wood preservatives in supercritical carbon dioxide with cosolvents," Fluid Phase Equilibria, 179, 2001, pp. 5-22.

F.J. Gonzales-Vila, et al., "Supercritical carbon dioxide extraction of lipids from *Eucalyptus globules* wood," J. Biochem. Biophys. Methods, 4, 2000, pp. 345-351.

A.S. Pimental, et al., "Chracterisatsion of polycyclic aromatic hydrocarbons in liquid products from pyrolysis of *Eucalyptus grandis* by supercritical fluid extraction and GC/MS determination," Fuel, vol. 77, No. 11, 1998, pp. 1133-1139.

J. Bludworth, et al., "Reactive Extraction of Lignin from Wood Using Supercritical Ammonia—Water Mixtures," The Journal of Supercritical Fluids, 6, 1993, pp. 249-254.

H. Lee, et al., "*In situ* extraction and derivatization of pentachlorophenol and related compounds from soils using a supercritical fluid extraction system," Journal of Chromatography, 605, 1992, pp. 109-113.

M.A. Schneiderman, et al., "Determination of Anthraquinone in Paper and Wood Using Supercritical Fluid Extraction and High-Performance Liquid Chromatography with Electrochemical Detection," Journal of Chromatography, 409, 1987, pp. 343-353.

E.C. McDonald, et al., "Chemicals from Forest Products by Supercritical Fluid Extraction," Fluid Phase Equilibria, 10, 1983, pp. 337-344.

E.J. Beckman, "Supercritical and near-critical $CO_2$ in green chemical synthesis and processing," J. of Supercritical Fluids, 28, 2004, pp. 121-191.

G. Lumia, et al., "Cork Material Treatment by Supercritical $CO_2$," 8$^{th}$ Meeting of Supercritical Fluids, Bordeaux 14-17, Apr. 2002, pp. 1-6

* cited by examiner

METHOD FOR TREATING AND EXTRACTING CORK ORGANIC COMPOUNDS, WITH A DENSE FLUID UNDER PRESSURE

BACKGROUND OF THE INVENTION

1. Field of the Invention

This invention relates to a process for the treatment and extraction of organic cork compounds using a dense fluid under pressure, and particularly a super-critical fluid.

2. Description of the Related Art

Cork is a natural impermeable and lightweight material derived from the bark of some types of oak such as cork oak, most of which are found in countries bordering the Mediterranean, in Europe and in North Africa.

Cork is used particularly for making bottle corks used to close receptacles such as bottles containing liquids for food consumption, particularly wine.

Bottle corks have been used to close wine bottles for very many years.

About 15 billion bottles are closed in this manner throughout the world every year.

Cork is a natural product that has properties particularly well suited for conserving wine in bottles. Cork is elastic, resilient, compressible, has a high coefficient of friction, is impermeable to liquids, and has a sufficient permeability to gases to enable the exchanges necessary for the product to mature in bottles.

However, occasionally, some alterations to the smell and/or taste of the conserved liquid such as wine compromise the coherence of the natural pair consisting of the cork and the wine.

These alterations are all referred to under the generic term "corky flavour".

It has been shown that most of these alterations are completely independent of the cork (stopper) and originate in the wine itself or in its preparation and storage.

However, other alterations are caused by the cork (stopper) and a great deal of work has been done throughout the world to find the cause of the problem and to find a solution.

Thus, it has been found that cork tastes can be globally distributed into "genuine" corky flavours, corky flavours, and finally musty tastes.

A "genuine" corky flavour is a putrid taste making the wine undrinkable. This defect is related to yellow stain, in other words growth of a higher fungus, *Armillaria mellea.*

Cork boards affected by yellow stain are usually put aside during the first cork board selection sort.

The frequency of this defect is of the order of 1 in 10 000 to 1 in 100 000.

The corky flavour is due to the fact that cork is not inert towards wine. It provides aromatic compounds in variable proportions that can interact positively or negatively with the wine.

The presence of more or less accentuated undesirable tastes is related to preparation of cork, particularly the storage duration in the yard and boiling conditions.

The frequency at which these tastes occur can be minimised by respecting the Code International des Pratiques Bouchonnières (International Cork-cutter Practices Code).

A "corky flavour" and a "musty taste" are very often confused. Musty tastes are fungus, forest undergrowth and mould type tastes related to the presence of organic molecules, the most frequently mentioned being methylisoborneol and its derivatives with a "musty and camphrous" smell, geosmine with an "earthy" smell, methylthio-ethyl-pyrazine with a "musty and sulphurous" smell, alcohols and unsaturated cetones in $C_8$ with a "mushroomy" smell, and particularly chloroanisoles and especially 2,3,4,6-TeCA2,4,6-TCA (trichloroanisole) and 2,3,4,6-TeCA (tetrachloroanisole).

These chloroanisoles, which smell very strongly and for which the perception threshold in water is between 0.03 and 4 ng/l, originate from methylation of slightly volatile chlorophenols that have a very mild smell. This reaction is carried out by a very large number of moulds and is equivalent to a chlorophenol detoxification reaction.

Chlorophenol type precursors may originate from different locations and from health care products, insecticide treatments, atmospheric pollution and cork degradation reactions, for example subsequent to some washing operations by hypochlorite.

Finally, particularly to eliminate "corky flavours" as much as possible, cork is subjected to various treatments and particularly cleaning operations.

Cleaning treatments and operations take place at different stages in the production or maintenance of cork objects, for example such as bottle corks (stoppers).

A treatment consists of eliminating micro-organisms from the cork, responsible for the production of undesirable metabolites during the treatments themselves after finishing.

Thus, before the bottle corks are finished, they are washed with chlorine using lime chloride or hypochlorite followed by washing with oxalic acid using a traditional process, or washing with peroxide (hydrogen peroxide or peracetic acid), or using sulfamic acid, or they are washed with metabisulfite using a solution of $SO_2$.

After the bottle corks have been finished (washed or unwashed), they are treated by the injection of $SO_2$, by ethylene oxide or by gamma radiation.

The most frequently used process for eliminating volatile compounds responsible for tastes is the use of hot or boiling water, known as "boiling".

Thus, in the F. BORDAS process that was first used in 1904, the parts are placed in a chamber heated to 120° C. for 10 minutes and a vacuum is then created, and then the pressure is restored by allowing steam to penetrate.

The chamber is then heated to 130° C. for 10 minutes.

This old method has never been supported by any precise and evaluated data.

The CHAMPCORK process consists of putting parts in a chamber saturated with steam at 130° C. and a pressure of 180 kPa for 18–20 minutes. Atmospheric pressure is then restored.

All these techniques described above have many disadvantages, including:

low efficiency towards organic compounds causing undesirable tastes;

incomplete efficiency towards some micro-organisms.

Furthermore, most of the techniques mentioned use chemical products that introduce risks, nuisances and constraints, both for the personnel who are using them and for the environment.

Thus, operators are exposed to the risk of inhaling noxious substances, which makes it necessary to wear a mask, whereas the effluents generated by these treatments contain large quantities of compounds containing sulphur and/or chlorine and must be subjected to a long and expensive purification process before they can be rejected.

The document by MIRANDA, Ana M. et al, "High-pressure extraction of cork with $CO_2$ and 1.4 dioxane", Process. Technol. Proc. (1996), 12 (High Pressure Chemical Engineering), pages 417–422, discloses a process for the treatment of cork using high pressure mixes (170 bars) of $CO_2$ and dioxane within a temperature range from 160° C. to 180° C. Suberine is extracted in this manner.

The conditions of the process disclosed in this document are completely incompatible with use of cork after treatment, particularly for the manufacture of bottle corks.

Document U.S. Pat. No. 5,364,475 discloses a wood cleaning process, particularly a process for extraction of pentachlorophenol (PCP) type compounds or other non-ionic biocide organic compounds in which the wood is firstly cut into suitable size pieces, and is then subjected to a treatment by a fluid in the super-critical state, for example $CO_2$.

A modifying agent or co-solvent chosen among methanol, ethanol and acetone is preferably added to the super-critical fluid in a proportion of 1 to 10% by weight, which increases the extraction efficiency.

The process according to this document is only applicable to pentachlorophenol (trichloroanisole and tetrachloroanisole are excluded) and can only extract contents compatible with potential changes to some environmentalist standards (Toxicity Characteristic Leaching Profile Level) (of the order of 0.1 ppm).

The outer shell of treated trunks is mentioned in this patent although it does not mention if the outer shell consists of cork or bark, since the outer shell described in this patent could also include wood if the impregnation process caused strong penetration into the PCP material. There is a very precise definition of the word "cork" in French and in English, to mean a type of material and also a variety. Cork oak (Quercus suber L.[1]) is a very particular species not mentioned in the American patent referred to above.

Furthermore, this patent states that the treated product must be divided into particles with a thickness not exceeding 1 to 5 mm but table 7 demonstrates that the extraction efficiency drops very quickly above a thickness of 0.25 mm.

This grinding and shredding step is extremely penalising and it means that the process cannot be used to treat cork boards or bottle corks under any circumstances.

Similarly, document DE-A-4 223 029 discloses a process for extraction of tar oil from old wood or wood waste, in which the wood is firstly ground to a size of 10 to 40 mm, and then is put into contact with a super-critical extraction fluid such as $CO_2$ or an aliphatic hydrocarbon with 3 to 5 carbon atoms for a sufficiently long time to reduce the concentration of tar oil to a required threshold.

A co-solvent such as ethanol or isopropanol can be added to the super-critical fluid with a content of 2 to 5% by volume of the moisture content in the wood.

Document WO-A-98/16288 applies to a process and an installation for the extraction of inorganic and/or possibly organic polluting compounds by a super-critical fluid such as $CO_2$, starting from a material such as wood.

The extracted polluting organic compounds are particularly polychlorobiphenyls, chlorophenols and polychlorophenols (PCP), lindane, polyaromatic organic compounds, insecticides, fungicides, and other additives that might be found in the wood.

A co-solvent such as water may be added to the super-critical fluid in proportions of 5 to 20% by weight.

None of the processes described above using a dense fluid under pressure is applied to cork, but cork is an extremely specific material for which the properties are very different from the properties of wood, mainly in terms of elasticity and density.

It could be added that the chemical composition of cork is very different from the chemical composition of wood, particularly concerning the composition in suberine, lignin and cellulose.

The chemical composition of cork is usually as follows:

46% suberine (the main constituent of cork). The very high compressibility and elasticity of cork are due to the presence of large quantities of suberine.

25% lignin (structure of the cellular walls).

12% cellulose and other polysaccharides. Cork cellulose is in free form.

6% tannins.

6% ceroids. Ceroids repel water and contribute to the impermeability of cork.

5% ash and other compounds.

Refer to the following documents for further information on this subject:

A. Guillemonat. Progrès récents dans l'étude de la constitution chimique du liège (Recent progress in the study of the chemical composition of cork). Ann. Fac. Sc. De Marseille, 1960, 30, 43–54.

H. Pereira. Chemical composition and variability of cork from Quercus suber L. wood Sci. Technol., 1988, 22 (3), 211–218.

The chemical composition of dry wood is usually as follows, for comparison purposes:

60% cellulose.

25% lignin (structure of cellular walls).

15% other compounds.

Cork is a specific material and is fundamentally different from wood due to this difference in its composition.

The study of prior art described above shows that there is a need that has not been satisfied for a process for the treatment or cleaning of cork in order to eliminate contaminating and polluting organic compounds such as chlorophenols and chloroanisoles responsible particularly for undesirable tastes and smells.

There is still a need for a process for cleaning cork in order to selectively eliminate the said contaminating organic products without also affecting some other organic compounds such as suberine, ceroids, lignin and cellulose that confer desirable or even essential properties to the cork, particularly in view of its use for the manufacture of bottle corks.

Preferably, this process must also simultaneously eliminate or limit the presence and proliferation of micro-organisms such as bacteria and fungi in cork.

BRIEF SUMMARY OF THE INVENTION

The purpose of this invention is to provide a cork treatment process that satisfies a number of requirements including all the needs and requirements mentioned above.

Another purpose of this invention is to provide a process for the treatment of cork that does not have the defects, disadvantages, limitations and disadvantages of processes according to prior art and that solves problems with processes according to prior art.

This purpose and other purposes are achieved according to the invention by a process for the treatment of cork or a cork-based material in which the cork or the said cork-based material is put into contact with a dense fluid under pressure at a temperature of from 10 to 120° C. and at a pressure of from 10 to 600 bars.

DETAILED DESCRIPTION OF THE INVENTION

"Cork" refers to materials made exclusively of cork, while cork-based material treated by the process according to the invention refers to materials usually containing a high proportion of cork, composite cork-based materials, etc.

As we will see later, cork or the cork-based material may be shaped or unshaped.

Under the temperature and pressure conditions of the process according to the invention, cork or the cork-based material can be cleaned and/or decontaminated with an excellent efficiency.

In other words, with the process according to the invention, it is possible to extract and/or eliminate all or almost all contaminants, pollutants and undesirable or organic compounds located in cork or the cork-based material, without affecting the content of compounds naturally present in cork or the cork-based material such as ceroids, suberine, lignin and cellulose, or keeping them at an acceptable level.

These compounds and their contents confer the necessary and essential properties to cork for most of its applications, and particularly for the manufacture of bottle corks.

Therefore, the properties of cork related to these compounds and their contents, are not deteriorated by the treatment in the process according to the invention.

In particular, these properties are physical, chemical and organoleptic.

The process according to the invention can be used to obtain cork or a cork-based material for which the properties after treatment are excellent, and are equivalent to or better than the properties of cork or the cork-based material treated by processes according to prior art, without any of their disadvantages.

Thus, and as already mentioned above, due to the drastic temperature and pressure conditions involved, the process disclosed in the document by MIRANDA et al. causes a considerable deterioration of the properties of cork, such that they become completely incompatible with use of cork after this treatment for the manufacture of bottle corks. Furthermore, the purpose of this document is fundamentally different, since unlike the process according to the invention, the objective is to extract suberine from cork, and not to keep the suberine in cork in order to preserve its properties.

Similarly, the process disclosed in this document is not intended to extract or specifically eliminate undesirable organic compounds, which is the essential purpose of this invention.

According to the invention, use of the fluid in the dense state under pressure under the conditions defined above can advantageously replace and/or improve conventional cork cleaning and/or decontamination processes.

According to the invention, the fluid in the dense state under pressure is preferably put into contact with cork or the cork-based material at a pressure of 100 to 300 bars and at a temperature of 40 to 80° C.

Also preferably, the said dense fluid under pressure is a fluid in the super-critical state, in other words the dense fluid is at a pressure and under a temperature such that the fluid is in the super-critical state.

Thus, in the process according to the invention, a gaseous compound for example is used under normal temperature and pressure conditions, and its density is increased by increasing its pressure. The temperature can also be modified to enter the range in which the fluid is in the dense state and under pressure, preferably in its super-critical state. Those skilled in the art will find it easy to define this range.

According to the invention, the extractive properties of the fluid can be varied in a controlled manner by varying the pressure and the temperature parameters while remaining within the dense range under pressure, and preferably within the super-critical range for the fluid concerned; thus, increasing the pressure and temperature increases the solubilisation capacity, whereas reducing the pressure reduces the viscosity and increases the diffusivity.

Thus, according to the invention, during the treatment it is possible to carry out compression/decompression cycles, preferably very fast cycles for example with an amplitude of the pressure variation from 10 to 100 bars and time intervals varying from ten seconds to a few minutes, for example 10 minutes, the complete process continuing for example for between 1 and several hours, for example 10 hours.

This increases the penetration of the solvent fluid into the material, which has the result of improving the cleaning performances and the internal flexibility of the cork.

The advantages of the process according to the invention are essentially related to the specific characteristics of fluids in the dense state under pressure, and particularly in the super-critical state, and due to the fact that, surprisingly, this technique can be applied to cork.

Considering the considerable differences between the properties of wood and cork, it was absolutely unpredictable that a process similar to the process for treating wood could also be applicable to cork or to cork-based materials.

The difference in composition between wood and cork that was clearly demonstrated above means that cork is an extremely specific material and that application of a dense fluid under pressure to treat cork could not be deduced from use of the same fluid to treat wood. Furthermore, the process according to the invention is applicable to cork originating from a very particular variety of tree (*Quercus suber* L.) that is raised several times so that its bark produces a material with properties that are very different from the bark of wood from other varieties. The resulting applications cover a wide variety of domains.

The fluid used may for example be chosen among carbon dioxide; sulphur hexafluoride; nitrous oxide; nitrogen monoxide; light alkanes, for example with one to five carbon atoms such as methane, ethane, propane, butane, isobutene, pentane; alkenes such as ethylene and propylene; and some organic liquids such as methanol and ethanol; etc.

Obviously, any compound that can be in a dense state under pressure, and particularly in a super-critical state, can be used, if use of this compound is compatible with cork or cork-based materials.

Carbon dioxide is preferred since it has the advantage that it is relatively easy to use; it is inexpensive, non-toxic, non-inflammable and has easily obtainable critical conditions (critical pressure $Pc=7.3$ MPa and critical temperature $Tc=31.1°$ C.).

$CO_2$ in the dense state under pressure, a liquid or super-critical, solubilises most organic compounds with molar masses less than or equal to 2000 g/mole. Therefore it is an excellent solvent for organic compounds called "undesirable compounds", for example such as pentachlorophenol (PCP) and tri or tetrachloroanisoles (TCA and TeCA) originating from the natural content in cork and/or accidental contamination.

The relative chemical inertia of $CO_2$ in the dense state makes it particularly suitable for use in a process designed to clean cork or a cork-based material, particularly when this cork or this material is intended to be used to make parts for food applications such as bottle corks.

Furthermore, the low viscosity of $CO_2$ in the dense state, its high diffusion coefficients and its very low interface tension enable cleaning of cork parts with complex shapes and complex physical characteristics, particularly in the presence of adsorption phenomena, either on the surface of the part or internally.

The advantages of $CO_2$ also include the fact that it can be used as a complement to or as a replacement for conventionally used processes:

- an almost perfect extraction efficiency for undesirable organic compounds, due to specific physicochemical characteristics;
- an almost zero residual effluent volume, limited strictly to recuperation of extracted pollutants (including PCP and TCA) and recycling of purified $CO_2$ gas;
- a large saving, for example in terms of solvent due to the lack of treatment or recuperation of effluents, or due to the use of inexpensive $CO_2$;
- respect of the environment, since the process generates no or very few aqueous effluents;
- modularity of the dissolving capacity of the molecule that varies as a function of usage conditions, in other words the pressure and the temperature, in order to adapt to the nature of the products to be extracted and/or the required application.

In other words, the pressure and temperature characteristics can be used to control a fluid for which the dissolving capacity can be varied in terms of solubilisation, and particularly contaminating, polluting and undesirable compounds of cork, and the extraction dynamics particularly within the porous solid matrix from which the cork is formed.

The excellent volatility of $CO_2$ under normal conditions (temperature and pressure) characterises it as a dry solvent not requiring any drying step after cleaning. Furthermore, $CO_2$ does not leave any residual trace on the treated part.

Treatment in a $CO_2$ atmosphere can avoid risks of oxidation and improve the final surface condition of the part.

Preferably, according to the invention, a "co-solvent" compound is added to the dense fluid under pressure. The addition of this type of co-solvent to a dense fluid under pressure within the specific context of treatment of cork, is not described or even suggested in prior art.

Surprisingly, according to the invention, it was observed that the addition of a co-solvent to the dense fluid under pressure can result in total extraction of contaminating and polluting organic compounds, in other words undesirable compounds, from cork or a cork-based material.

As mentioned above, the addition of the co-solvent guarantees selective extraction of undesirable organic compounds, while maintaining acceptable levels of the content of compounds naturally present in the cork such as ceroids, suberine, lignin and cellulose.

In other words, the addition of an appropriate co-solvent is a means of controlling the selectivity towards the extraction of pollutants, contaminants and undesirable organic compounds that are to be eliminated and extracted.

Furthermore, and completely surprisingly, it has been observed that the addition of a co-solvent causes a reduction in the growth of micro-organisms very much greater than the reduction obtained with $CO_2$ alone, due to a type of synergy effect, and this reduction in the growth of micro-organisms can change from a factor of 100 to a factor of 1 million when the co-solvent is added.

According to the invention, the said co-solvent is chosen for example from among water, aqueous solutions, alcohols, for example aliphatic alcohols from 1 to 5 C such as ethanol, methanol, butanol, ketones such as acetone, and their mixtures.

Among aqueous solutions, it is worth mentioning buffer solutions for example such as phosphate and/or hydrogenosphosphate solutions, etc., to stabilise the pH of the process; antibiotic solutions such as penicillin and/or fungicide solutions, to increase the elimination of micro-organisms; antioxidant solutions such as ascorbic acid to stabilise the material, etc.

According to the invention, the said co-solvent is added to the dense fluid under pressure with a content of 0.01 to 10% by weight, and preferably 0.02 to 1% by weight and even more preferably 0.02 to 0.1% by weight.

If the co-solvent is water, part of it may already be present in cork, and only the necessary quantity to give the concentrations mentioned above will be added to the super-critical fluid.

Thus, the invention also relates to a process for selective extraction of contaminating organic compounds from cork or a cork-based material, in which the said cork-based material is treated by bringing it into contact with a dense fluid under pressure under the temperature and pressure conditions according to the invention, a co-solvent being added to the dense fluid under pressure.

The contaminating or polluting organic compounds mentioned above, to which the process according to the invention can be applied, are organic compounds that could be located in cork and that form pollutants or contaminants that must be eliminated to enable use of cork or the cork-based material without any disadvantages.

Other organo-chlorinated compounds such as lindane and polyaromatic organic compounds (HPA) may also be extracted using the process according to the invention.

The process according to the invention is also applicable to the extraction of organic compounds such as triazole, synthetic pyrethroids, insecticides and fungicides that may be present in cork.

Note that for simplification reasons, the term "organic compounds" is frequently used in the plural in the description, although it is obvious that the process according to the invention may apply to a single organic compound.

According to the invention, the said extracted contaminating, polluting organic compounds are essentially and preferably the organic compounds responsible for undesirable tastes and/or smells.

An "undesirable" taste or smell usually means a taste or a smell that is not required in cork, particularly under the conditions under which it is used, for example when coming into contact with a consumable liquid.

An "undesirable" taste or smell can generally be defined as a taste or smell considered to be "unpleasant" by most users.

These compounds responsible for undesirable tastes and/or smells are usually (poly)chlorophenols and other phenolic compounds and (poly)chloroanisoles and other derivatives of anisole, and particularly pentachlorophenol (PCP), trichloroanisole (TCA) and tetrachloroanisole (TeCA).

The compounds mentioned above are present in cork either naturally or in an induced manner.

Extraction according to the process described in our patent is done on organic products that do not originate from a treatment carried out intentionally as is the case for cut wood (trunks, boards, etc.) for preservation of boards or other wood-based materials that need to be depolluted for recycling purposes.

As already mentioned above, surprisingly the extraction process according to the invention can be used for complete and selective elimination of organic compounds responsible for undesirable tastes and/or smells in cork, while keeping the content of a number of compounds such as ceroids, suberine, tannins, lignin and cellulose conferring physical, chemical and organoleptic and mechanical qualities essential to cork, particularly when it is used for the production of bottle corks, at a suitable level.

The elimination of undesirable organic compounds and particularly TCA, without simultaneously eliminating ceroids necessary particularly for the good mechanical behaviour of a bottle cork, is a surprising effect of the process according to the invention and is not described or suggested by prior art.

The process thus satisfies a need that has not been satisfied for a long time in the state of the art and overcomes a widespread preconception among professionals in the cork business by which it is impossible to selectively eliminate undesirable compounds without affecting beneficial compounds.

Within the context of the extraction process according to the invention, the fluid used is preferably $CO_2$ and the co-solvent, chosen from among water and aqueous solutions is added to the $CO_2$ under pressure with a content of 0.01% to 10% by weight.

According to the invention, a selective extraction of pollutants and contaminants can be achieved together with a reduction (by synergy) of the growth of micro-organisms at contents of the co-solvent as low as 0.01% by weight, for example 0.02 to 1% by weight, and preferably 0.02 to 0.2% by weight.

The temperature and pressure ranges involved during the extraction or treatment operation can vary, provided that the fluid always remains a dense fluid under pressure, preferably in a super-critical state, and that compression/decompression cycles can also be carried out, as mentioned above.

The temperature and pressure ranges depend particularly on the nature of the fluid used.

These temperature and pressure ranges have already been mentioned above and are particularly applicable to $CO_2$.

These conditions can be maintained throughout the duration of the process, or simply at the beginning of the extraction or treatment process, in which these conditions correspond to a high density and a high temperature—the overriding phenomenon being solubilisation—in order to very quickly extract compounds outside the matrix.

In general, the treatment or extraction time (in other words the time during which cork or the cork-based material is left in contact with the dense fluid under pressure) is between one or a few minutes, for example 10 minutes, or one or a few hours, for example 10 hours, depending on the fluid flow and the quantity of materials to be treated.

After a few minutes, in other words for example after 5 to 20 minutes, and when the pressure and temperature conditions according to the process are applied to the materials, the extraction takes place very quickly due to a very high diffusion capacity.

After reaching equilibrium, for example after 30 to 60 minutes, it can be considered that extraction is complete with an efficiency for example close to 99.9%.

Extraction efficiencies are always very high, even for compounds containing chlorine, for which the efficiency is better than 85%, for example 98%.

The solvent content used, in other words the weight of the dense fluid—solvent—preferably super-critical, used compared with the weight of cork or the cork-based material, is usually 10 to 100 kg of fluid/kg of cork or cork-based material.

Advantageously, the process according to the invention comprises a fluid recycling step after the extraction or treatment and after one or several physicochemical separation steps, in order to separate the fluid from the extracts.

Conventionally, the first separation steps consist of reducing the density of the fluid by a series of pressure reductions and temperature increases in order to get closer to the gaseous state.

The dissolving capacity of the fluid drops, and thus some of the extracts solubilised in the extraction step are recovered.

Thus, the process according to the invention for the extraction or treatment of cork can be used to physically separate the useable cork or the cork-based material usually representing about 90 to 99% of the initial product, from undesirable, natural or artificial organic products representing less than about 1% to 10% of the initial product and that can be manipulated, treated and eliminated specifically and therefore can be easily controlled, while the gas or fluid may advantageously be recycled so that it can be used for another extraction or another treatment.

Consequently, the treatment or extraction process may be done in a closed circuit or in a loop which means that advantageously, due to an initial and constant content of a fluid such as $CO_2$, the undesirable organic compounds can be gradually depleted from the or the cork-based material.

More precisely and after the extraction process itself, the process according to the invention advantageously comprises one or several steps, for example up to three physicochemical separation steps in which the density of the fluid is reduced, for example by a series of pressure reductions and temperature increases, preferably between 1 and 3, in order to get closer to the gaseous state.

For example, the conditions in these successive steps may be 90 bars and 50° C., 70 bars and 40° C., 50 bars and 40° C.

Since the isolating capacity of the fluid is reduced, the extracts previously solubilised in the extraction step are thus recovered.

These extracts are in the form of more or less fluid concentrated liquids and may be treated specifically and possibly destroyed in the case of pollutants.

The gas obtained at the end of the separation step is preferably recycled to the extraction step, where it is reconditioned in order to restore temperature and pressure conditions so that it is in a super-critical state, the gas can thus be firstly cooled to atmospheric pressure, stored in liquid form and then heated and compressed before being sent to the extraction process itself.

Before being recycled, the gas is preferably purified, for example by active carbon, in order to eliminate traces of volatile organic products that were not separated in the previous step.

Thorough purification of the gas is usually necessary, otherwise extraction performances will be very much reduced.

According to the invention, cork or the cork-based material may also be subjected to a mechanical and/or chemical treatment, before the treatment or extraction using the dense fluid under pressure.

A mechanical and/or chemical treatment usually means a known treatment as described above within the context of the presentation of prior art.

This treatment is preferably a treatment using hot or boiling water, usually called a "boiling" treatment.

According to the invention, cork or the cork-based material is shaped before or after the said treatment or the said extraction using the dense fluid under pressure; either earlier than the said mechanical and/or chemical treatment, if any, preceding the said treatment or the said extraction by the dense fluid under pressure; or later than the said mechanical and/or chemical treatment, if any, after the said treatment or the said extraction by the dense fluid under pressure.

In other words, in the process according to the invention, the part or parts to be cleaned, in other words the unprocessed parts before or after stamping and before or after the mechanical and/or chemical treatment, and preferably the boiling treatment, are put into contact with the fluid in the dense state under pressure.

This shaping, working or stamping is intended to bring cork or the cork-based material, usually pure cork, into the shape required for the planned use, which may be boards, stamped or moulded bottle corks, for example bottle corks made of composite materials, cork parts used for the manufacture of objects or devices made for food or non-food applications.

We saw above that the process according to the invention is particularly suitable for preparing cork or a cork-based material with optimum qualities for manufacturing a bottle cork.

Thus, the invention also applies to a process for manufacturing bottle corks made of cork or made of a cork-based material, that includes at least one treatment or extraction step as described above.

The invention also relates to an installation for manufacturing parts such as bottle corks made of cork or made of a cork-based material, that includes an installation for the treatment or extraction of the said material by bringing it into contact with a dense fluid under pressure, under the conditions described above.

This step may be included at any point in the process for manufacturing bottle corks.

"Substantially free from" means that the content of these compounds is such that the undesirable smell and/or taste caused by the compounds is/are not present in cork or the cork-based material according to the invention.

Bottle corks according to the invention are particularly useful for closing off receptacles such as bottles, barrels, drums or other receptacles containing food products and preferably liquids such as wine products.

Finally, the invention relates to a process for disinfection of cork or cork-based material and/or making it aseptic by bringing the said material into contact with a dense fluid under pressure, to which a co-solvent is added.

Figure 1:
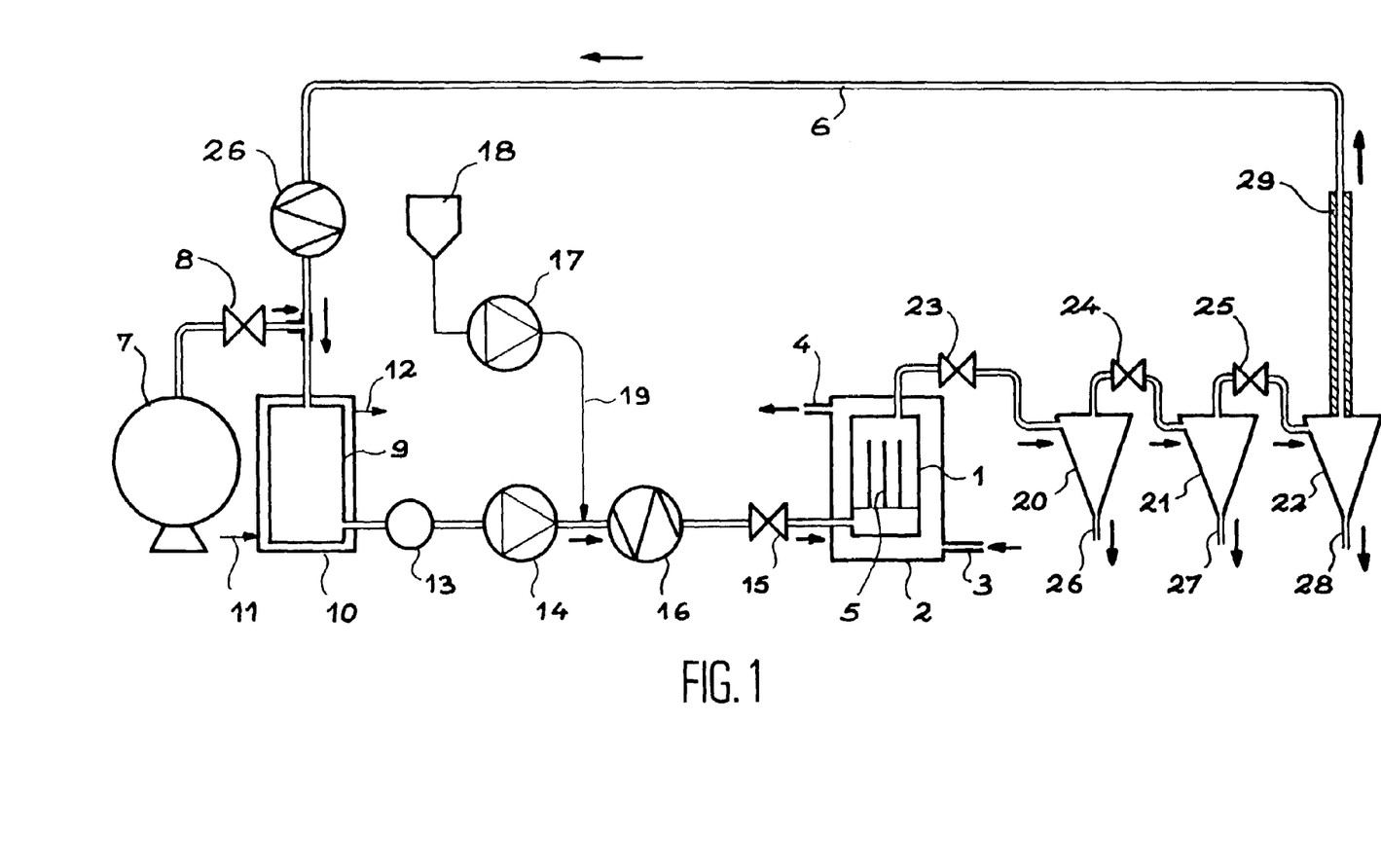
FIG. 1 shows an example of an apparatus that may be used to carry out the invention.
Figure 2:
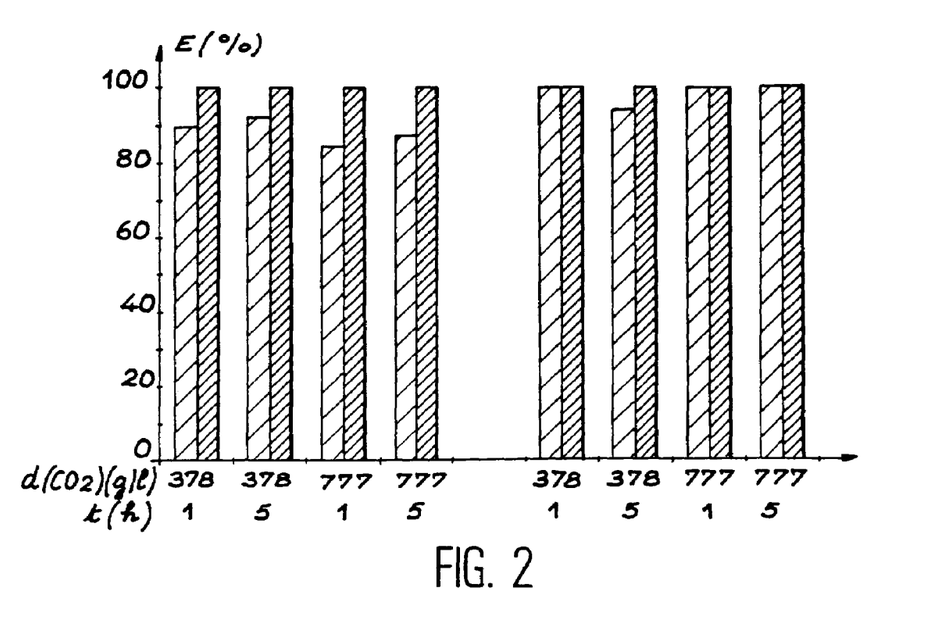
FIG. 2 shows a graph comparing the cleaning efficiency of various corks.
Figure 3:
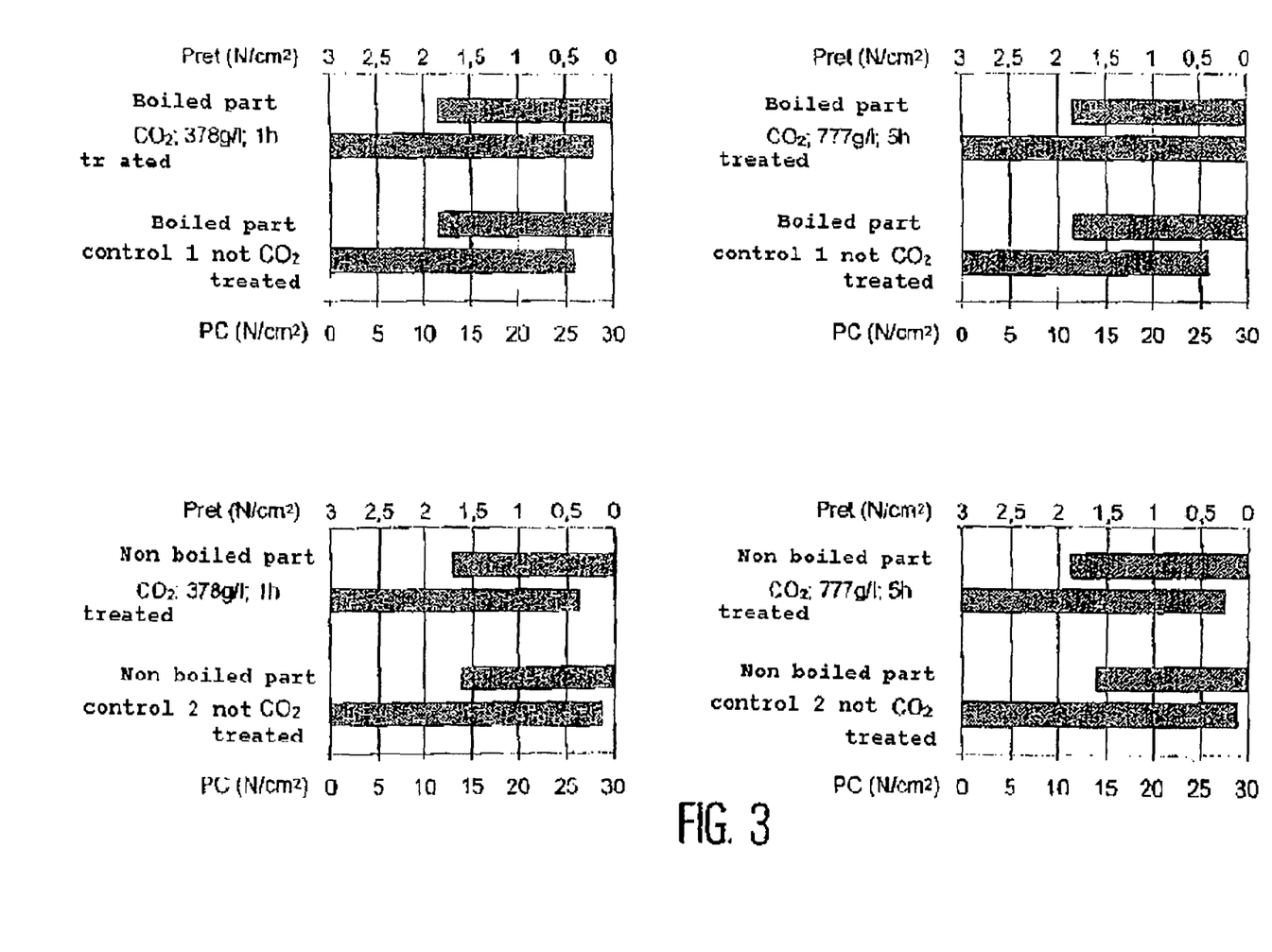
FIG. 3 shows the mechanical characteristics of corks under different cleaning conditions.

The invention will be better understood after reading the following description with reference to the attached drawings, in which:

FIG. 1 diagrammatically shows a sectional view of an elevation of an example installation for an embodiment of the process according to the invention;

FIG. 2 is a graph showing the cleaning efficiency E as a percentage of cork parts with PCP and TCA supplements, boiled (at right) and unboiled (at left) for different treatment times t (in hours) and different densities of $CO_2$ (in g/l), the columns with close cross-hatching being applicable to PCP (pentachlorophenol) and columns with wide cross-hatching being applicable to TCA (2,4,6-trichloroanisole);

FIG. 3 contains a graph showing the evaluation of the mechanical strength of "tubed" bottle corks cut from cork boards treated and not treated by $CO_2$, and boiled and unboiled control parts;

The mechanical strength was evaluated by measuring compression pressures (PC) and return pressures (Pret).

Figure 4:
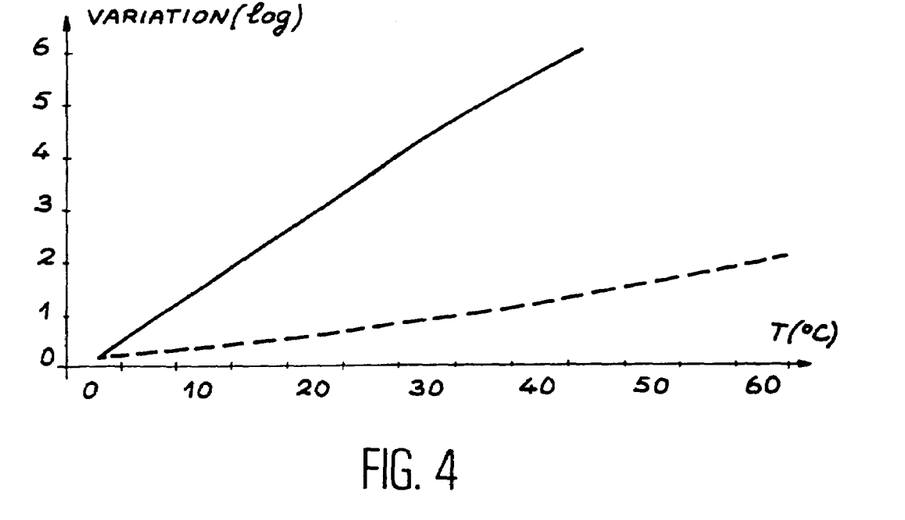
FIG. 4 shows the effect of a co-solvent on the reduction of microbial growth.

FIG. 4 is a graph showing the logarithmic variation, variation (log), of microbial growth as a function of the applied temperature (T (° C.)) during the treatment by $CO_2$ only (curve in dashed lines) or by $CO_2$ plus water (curve with solid lines).

FIG. 1 diagrammatically shows a sectional view of an elevation of the installation according to the invention.

Obviously, a figure of this type only shows an example embodiment of an installation and is only given for illustrative purposes and are in no way restrictive.

This figure shows means of bringing the cork or cork-based material into contact in the form of an extractor or autoclave (1).

This type of extractor can resist the pressure applied in the process according to the invention and it is also provided with heating and temperature regulation means in the form of a thermostat controlled double shell (2), inside which a suitable heat transporting fluid (3), (4) can circulate.

The volume of the extractor or autoclave is variable, and depends particularly on the quantity of cork to be processed; it can easily be determined by those skilled in the art.

The cork or cork-based material parts to be treated (5), for example in the form of boards, sheets or bottle corks, are put into the extractor, and these parts are preferably placed on one or several supports or grills.

FIG. 1 shows only one extractor (1) in the installation, but it is quite obvious that the installation may comprise several extractors (for example 2 to 10 laid out for example in series).

The installation also comprises means of bringing a fluid, such as $CO_2$ to the dense state under pressure, for example to the super-critical state.

Thus in FIG. 1, the fluid, for example $CO_2$, from a recycling pipe (6) and/or possibly a storage and make up reservoir, for example $CO_2$ (7) penetrates through a valve (8) into a liquefaction reservoir (9) provided with temperature regulation means in the form of a thermostat controlled double shell (10), inside which a suitable heat transporting fluid (11, 12) can circulate.

The said fluid such as $CO_2$ is thus liquefied and circulates through a flowmeter (13), and is then pumped and compressed by a pump (14), for example a membrane type or piston type compression pump, or for example by a compressor to the extractor (1).

Before being introduced into the extractor (1) through a valve (15), the fluid, for example pumped $CO_2$, is heated in an exchanger (16) called a "super-critical" exchanger in which it is heated until it is under conditions in which it is in the form of a dense fluid under pressure, and in particular a dense super-critical fluid.

In other words, the fluid is heated above its critical temperature in this exchanger, which for example is 31.1° C. for $CO_2$.

FIG. 1 also shows means of injecting a co-solvent in the form of a high pressure pump (17) supplied by a co-solvent reservoir (18) that progressively adds a known quantity of co-solvent in the compressed fluid through a pipe (19)

connected to the fluid supply pipe to the extractor (1), on the input side of the exchanger (16) and on the output side of the compression pump (14).

Therefore, the temperature of the mix consisting of the compressed fluid and the co-solvent is increased to the working temperature through the exchanger (16).

According to the invention, the fluid and co-solvent mix impregnates the parts to be treated (5) made of cork or cork-based material, for example cork boards or bottle corks already stamped, in the chamber of the extractor (1), and extracts the undesirable contaminating chemical compounds.

One or several parts may be treated simultaneously, depending on the size of the parts to be treated.

The impurities contained in the fluid such as $CO_2$ will increase as a function of the contact time between the two bodies, provided that the solubility is not too great, by splashing.

Thus, the super-critical fluid at the inlet to the extraction autoclave (1) will be a homogeneous fluid solution such as $CO_2$ and co-solvent.

The cork content could also be mixed with a known proportion of co-solvent before the extraction operation, in other words before the fluid is added into the autoclave.

The current of fluid such as $CO_2$, in which compounds extracted from the cork are solubilised, is then sent to separation means connected to the top of the extractor or the autoclave (1), and for example comprising three cyclone type separators (20, 21, 22) connected in series, each of them being preceded by an automatic pressure reduction valve (23, 24, 25).

Three cyclone type separators (20, 21, 22) are shown in FIG. 1, but it is obvious that the number, type and sequence of the separators can vary.

The pressure reduction applied to the fluid takes place at constant temperature.

The organic compounds in liquid form extracted from cork are separated or demixed from a gas, for example $CO_2$, in each separator.

Compounds extracted from cork are drawn off (26, 27, 28), for example at the bottom of the separators, and are recovered and then other separation, extraction or purification operations, for example centrifuging, settlement or liquid/liquid extraction are possibly carried out on them, or they may be destroyed.

The gas derived from the separation, such as $CO_2$, is cleaned and is then sent to fluid recycling means that comprise essentially a pipe (6) and a "cold" exchanger (26) or liquefier, for example in the form of a thermostat controlled chamber, to be sent to the low temperature liquid reserve (9) kept cool by a cooling batch that cools and liquefies the fluid (11, 12) such as $CO_2$ The cleaning means (29) have been shown in FIG. 1 as a reflux column or an active carbon column (29) placed on the fluid recycling means.

Finally, the installation comprises regulation means (not shown), particularly for the pressure, in the different parts of the process, that comprise a regulation system composed of pressure sensors, regulators and pneumatically controlled needle valves.

The invention will now be described with reference to the following examples that are given for illustrative purposes and are in no way restrictive.

EXAMPLES

Cork samples were treated or cleaned using the process according to the invention, using an installation similar to that shown in FIG. 1, the fluid being dense $CO_2$ under pressure.

More precisely, this installation comprises:
- a $CO_2$ reserve in the form of a sphere containing about 300 kg, this type of sphere being commercially available;
- a liquefier in the form of a steel chamber occupying about 2 liters and with a low temperature thermostat control, by means of a cooling bath;
- a 0 to 300 bar compression pump with a maximum flow of 10 kg/h;
- a 0 to 300 bar co-solvent pump to gradually add a co-solvent such as water at about 0.01 to 0.1% by weight, into the dense $CO_2$ under pressure;
- a super-critical exchanger in the form of a thermostat controlled double shell;
- an extractor in the form of an autoclave with a volume of 6 liters and a maximum pressure of 300 bars provided with a double shell;
- three cyclone type separators provided with automatic pressure reduction valves.

The cork parts to be treated are placed in the autoclave and are in the form of boards or sheets with dimensions equal to a few tens of centimeters.

The cork parts to be treated are divided into two different batches:
- a first batch of cork parts was boiled in accordance with normally accepted practice for this type of material; namely immersion for 1 h 30 in water at 100° C.;
- a second batch of cork parts was unboiled.

The two batches were subjected to a supplementation treatment with an aqueous solution of PCP (pentachlorophenol) and TCA (trichloroanisole) by dipping in a receptacle for several hours, namely from 1 to 5 hours, with ultrasound action to complete impregnation of cork parts.

The content of PCP and TCA in the cork parts is measured before and after treatment of these parts by the process according to the invention.

These measurements are made by grinding the sample, liquid-solid extraction, transformation into acetate for the PCP, purification on cartridge and analyses by gaseous phase chromatography and mass spectrometry.

Mechanical tests are also carried out on bottle corks "tubed" from treated and untreated, boiled and unboiled cork parts (boards). These tests are as follows:
- measurement of the compression pressure (PC) that consists of measuring the pressure to be applied to reduce the nominal diameter of a 24 mm bottle cork down to 16 mm, which is the compression diameter of a bottle-corking machine;
- measurement of the return pressure (Pret) that is the measurement of the pressure exerted by the bottle cork while it returns from 16 mm, which is the compression diameter of a bottle-corking machine, to 21 mm, which is the maximum diameter of a bottle neck.

Finally, microbial flora culture tests for yeast, moulds, mesophilic aerobic germs, enterobacteria, coliforms, bacillus and sulfito-reducing anaerobia, were carried out by counting on specific seeding media and evaluated by the reduction in the logarithm of the growth of this flora after treatment by $CO_2$ in the dense state under pressure, with and without water as co-solvent.

Examples 1 and 2 given below are particularly related to the elimination of organic compounds from cork samples that had previously been supplemented to make their contents very much greater than contents normally encountered in cork production intended for manufacturing bottle corks.

Example 1

Parts (boards) made of cork representing a total quantity of about 400 g of cork were treated using the process according to the invention.

No prior boiling treatment was done on these parts.

The initial content of PCP and TCA after an analysis using the operating method defined above, was found to be 75 ppb for each contaminating product.

The operating conditions of the process according to the invention are generally as follows:

co-solvent: distilled water at about $0.2°/_{oo}$;
operating pressures: from 100 to 300 bars;
temperature: about 50° C.;
treatment time: from 1 to 5 hours;

At the end of this treatment, these cork parts are analysed to determine the residual content of PCP and TCA.

The mechanical strength of the bottle corks "tubed" from these boards is also measured by making measurements of the compression pressure "PC" and the return pressure "Pret" described above.

For the final evaluation, the measurements were also made on control bottle corks tubed in parts (boards) not treated using the process according to the invention in order to compare the mechanical strength obtained after treatment using the process according to the invention, with the strength obtained in the absence of any treatment using this process.

FIG. 2 shows the results obtained in terms of cleaning efficiency as a percentage, which is defined as the ratio of the contaminant masses (PCP or TCA), measured by analysis in parts before and after cleaning using the process according to the invention, and using the following formula:

$$\text{Efficiency \%} = \left(1 - \frac{\text{contaminant mass after treament}}{\text{contaminant mass before treatment}}\right) \times 100$$

The cleaning efficiency is shown in FIG. 2 for different treatment durations and for each contaminant PCP and TCA.

FIG. 3 shows the results obtained for evaluation of the mechanical strength (in $N/cm^2$) of bottle corks tubed from treated and untreated cork parts (boards), using measurements of the compression pressure "PC" and the return pressure "Pret".

A control sample that was not treated using the process according to the invention is used as a reference.

Refer to table 1 for information about the results of tests on the mechanical strength of bottle corks tubed from treated and untreated cork boards using the process according to the invention.

The table also shows specific conditions for the treatment according to the invention used in this example.

Example 2

The process according to the invention was used to treat cork parts (boards), with a total quantity of about 400 g of product.

Unlike example 1, these parts were previously subjected to a boiling treatment (immersion for 1 h 30 in water at almost 100° C.).

The initial content of PCP and TCA determined by analysis using the operating method described above, was found to be 50 ppb for each contaminating product.

The same measurements described in example 1 were made on the cork parts (boards).

These measurements were also made on bottle corks made from the control part not treated by the process according to the invention.

As in example 1, the results for the cleaning efficiency are shown in FIG. 2; whereas the results for the mechanical strength of bottle corks tubed from the parts (boards) are shown in FIG. 3 and are also given in table 1.

TABLE 1

|  |  |  | PC ($N/cm^2$) | Pret ($N/cm^2$) |
|---|---|---|---|---|
| Boiled boards (B) | | | | |
| 120 bars, 60° C., 1 h, 6.5 kg/h | Test P1 | Control B | 26 | 1.8 |
|  |  | BP1 | 28 | 1.8 |
| 250 bars, 60° C., 5 h, 10 kg/h | Test P2 | Control B | 26 | 1.8 |
|  |  | BP2 | 30 | 1.8 |
| Unboiled boards (AVB) | | | | |
| 120 bars, 60° C., 1 h, 6.5 kg/h | Test P1 | Control AVB | 29 | 1.6 |
|  |  | AVBP1 | 26 | 1.7 |
| 250 bars, 60° C., 5 h, 10 kg/h | Test P2 | Control AVB | 29 | 1.6 |
|  |  | AVBP2 | 27 | 1.9 |

*PC: compression pressure
Pret: return pressure

An analysis of the results given in examples 1 and 2 for the cleaning efficiency (FIG. 2), shows that the efficiency obtained after treatment according to the invention using dense $CO_2$ under pressure is very close to 100%, both for extraction of PCP for which the efficiency varies from 84 to 100%, and for extraction of TCA which is 100% in all cases.

In example 1 for unboiled samples, the efficiency ranges from 84 to 92% for extraction of PCP, which gives a residual content of 12 to 6 ppb for an initial content of 75 ppb.

The efficiency obtained for the extraction of TCA is complete and equal to 100%, which means that the residual content of TCA is less than the detection limit of the analysis method used.

In example 2, the PCP extraction efficiency for the boiled samples is found to be slightly better and ranges from 94 to 100%, corresponding to a residual content varying from 3 ppb to a value below the detection limit of the PCP and TCA analysis method, for treatment conditions identical to those in example 1, but with a 50 ppb lower initial content of PCP and TCA.

The extraction efficiency on TCA is complete and equal to 100%.

For the results obtained for the mechanical strength of the bottle corks tubed from the treated cork parts (boards) (FIG. 3), all results in examples 1 and 2 show the excellent mechanical strength of cork parts treated by $CO_2$ using the process according to the invention.

A difference in the measurements of the compression pressure PC, is observed between bottle corks tubed from the control parts not treated with $CO_2$ compared with bottle corks that are tubed in the parts cleaned by $CO_2$, but this difference does not exceed 5 $N/cm^2$.

Furthermore, the variation affecting the mechanical strength is of the same order of magnitude for bottle corks tubed from treated parts as is normally obtained on bottle corks tubed from the control parts, as demonstrated by the following values of the mechanical strength:

bottle corks tubed from control parts not treated with $CO_2$;
27.5±1.7 $N/cm^2$ (for n=4);
bottle corks tubed from parts treated with $CO_2$ (examples 1 and 2);
27.8±1.7 $N/cm^2$ (for n=4);

Similarly, no significant variation was found in the results obtained when measuring return pressures Pret, for which values obtained are:

1.7±0.1 $N/cm^2$ (n=4) for control parts;
1.8±0.1 $N/cm^2$ (n=4) for treated parts (examples 1 and 2).

Finally, it is observed that the density of $CO_2$ is a parameter that has less influence than the treatment time or the initial content of organic compounds responsible for the undesirable taste (PCP and TCA).

The results given above show that cork parts treated by the process according to the invention can also be used for stamping and/or for wine bottle corks.

Example 3

This example shows the anti-microbial efficiency of the process according to the invention when water, is added as a solvent to the dense fluid under pressure.

Parts of a substrate similar to the described material (cork) are thus treated by dense $CO_2$ under pressure, to which 0.02% by weight of water has been added, at a pressure of 300 bars and under a temperature varying from 0 to 60° C.

The growth of micro-organisms is determined using the operating method described above.

Equivalent substrate (cork) parts are treated under the same conditions, but without any water being added to the dense fluid under pressure, and the growth of micro-organisms is determined once again.

The results obtained are shown in FIG. 4 that indicates the logarithmic variation of microbial growth obtained as a function of the temperature (in ° C.) applied during the treatment.

The curve shown in solid lines is the curve for treatment by $CO_2$ to which water has been added, while the curve shown in dashed lines is applicable to treatment by $CO_2$ alone without the addition of water.

It is found that the treatment applied using dense $CO_2$ under pressure results in a maximum reduction in microbial growth by a factor of 100, and only for a treatment temperature of 60° C.

On the other hand, this reduction is as high as a factor of 1 million for a temperature of 40° C. when $CO_2$ is used with water.

Without being restricted to any particular theory, it is probable that even small proportions of water in the presence of $CO_2$ produce carbonic acid such that the pH of the mix becomes acid.

The combined action of pressure and acidity thus produces an effect that is highly damaging to the survival of the micro-organisms present.

The invention claimed is:

1. A process, comprising:
    extracting one or more organic compounds from at least one of cork or a cork-based material with a dense fluid under pressure at a temperature of from 10 to 120° C. and a pressure of from 10 to 600 bar;
    wherein the dense fluid under pressure comprises at least one cosolvent in an amount of from 0.01 to 10% by weight based on the total weight of the dense fluid under pressure,
    wherein the dense fluid is in a supercritical state, and
    wherein the extracting includes alternately increasing and decreasing the pressure in a plurality of cycles with an amplitude of pressure variation of from 10 to 100 bar and a time interval of from 10 seconds to 10 minutes.

2. The process according to claim 1, further comprising:
    adding the cosolvent to the dense fluid under pressure, before the extracting.

3. The process according to claim 1, wherein the extracting is carried out at a temperature of from 31.1 to 80° C. and a pressure of 73 to 300 bar.

4. The process according to claim 1, wherein the dense fluid under pressure is at least one selected from the group consisting of carbon dioxide, sulfur hexafluoride, nitrous oxide, nitrogen monoxide, an alkane containing 1 to 5 atoms of carbon, an alkene, and an organic liquid.

5. The process according to claim 1, wherein the extracting eliminates one or more undesirable organic compounds selected from the group consisting of a (poly)chlorophenol, a pentachlorophenol, a (poly)chloroanisole, a trichloroanisole and a tetrachloroanisole, without simultaneously eliminating any ceroids.

6. The process as claimed in claim 1, wherein the extracting eliminates one or more organic compounds selected from the group consisting of trichloroanisole and tetrachloroanisole, without eliminating any ceroids.

7. The process as claimed in claim 1, wherein the cosolvent is at least one aqueous solution selected from the group consisting a buffer solution of phosphate, a buffer solution of hydrogen phosphate, a solution of ascorbic acid and a mixture of water and an alcohol.

8. The process according to claim 1, wherein the extracting is carried out from 30 to 60 minutes and one or more polychlorophenols present in the cork or the cork-based material is extracted.

9. The process as claimed in claim 1, wherein the extracting is carried out from 30 to 60 minutes and of one or more polychloroanisoles present in the cork or the cork-based product is extracted.

10. The process according to claim 1, wherein the extracting is carried out by contacting from 10 to 100 kg of the dense fluid under pressure with 1 kg of the cork or the cork-based material.

11. The process as claimed in claim 1, wherein the cosolvent is present in an amount effective to reduce microbial growth on the cork or the cork-based product more than the reduction in the amount of microbial growth when the cork or the cork-based material is extracted with the dense fluid under pressure in the absence of the cosolvent.

12. The process according to claim 1, wherein the cosolvent is at least one selected from the group consisting of water, an aqueous solution, an alcohol, a ketone and mixtures thereof.

13. The process as claimed in claim 1, wherein the extracting is carried out to remove organic compounds having an undesirable taste, an undesirable smell, or both an undesirable taste and an undesirable smell.

14. The process according to claim 1, wherein the extracting removes one or more organic compounds selected from the group consisting of a phenolic compound and an anisole compound.

15. The process according to claim 1, further comprising:
gasifying the dense fluid under pressure by changing at least one of the temperature and the pressure to separate one or more extracts, and
recycling the gasified dense fluid.

16. The process according to claim 1, further comprising:
chemically or mechanically treating the cork or the cork-based material before or after extracting the organic compounds from the cork or the cork-based material with the dense fluid under pressure.

17. The process according to claim 1, further comprising:
shaping the cork or the cork-based material before or after the extracting.

18. A process for manufacturing bottle corks, comprising:
shaping a bottle cork from the cork or the cork-based material obtained by the process of claim 1.

19. The process according to claim 1, wherein the dense fluid under pressure is supercritical $CO_2$, the cosolvent is water, the temperature is from 40 to 80° C., and the pressure is from 100 to 300 bar.

20. The process according to claim 1, further comprising:
forming one or more extracts by extracting the organic compounds from the cork or the cork-based material with the dense fluid under pressure,
separating the dense fluid under pressure from the extracts,
vaporizing at least a portion of the separated dense fluid under pressure to form a gaseous fluid, and
recycling the gaseous fluid.

21. The process according to claim 3, wherein the cosolvent is water and the dense fluid under pressure is supercritical carbon dioxide.

22. The process according to claim 12, wherein the cosolvent further comprises at least one selected from the group consisting of a fungicide, an antibiotic and an antioxidant.

23. The process according to claim 17, wherein the shaping includes shaping the cork or the cork-based material into the form of one or more of a bottle cork, a board and a sheet.

24. The process according to claim 19, wherein the dense fluid under pressure comprises the cosolvent in an amount of from 0.02 to 0.2% by weight.

25. The process according to claim 21, wherein the dense fluid under pressure comprises the cosolvent in an amount of from 0.02 to 1% by weight.

26. The process according to claim 21, wherein the dense fluid under pressure comprises the cosolvent in an amount of from 0.02 to 0.1% by weight.

* * * * *